United States Patent [19]

Martin

[11] 4,387,973
[45] Jun. 14, 1983

[54] APPARATUS FOR MAINTAINING CLEAN OPTICAL SURFACES IN PROCESS ENVIRONMENTS

[75] Inventor: John R. Martin, Foxboro, Mass.
[73] Assignee: The Foxboro Company, Foxboro, Mass.
[21] Appl. No.: 258,983
[22] Filed: Apr. 30, 1981
[51] Int. Cl.³ ............................................... G02B 7/18
[52] U.S. Cl. .................................... 350/582; 350/295
[58] Field of Search ................ 350/61, 295, 360, 361, 350/487, 319, 1.7, 582; 428/38, 473.5

[56] References Cited

U.S. PATENT DOCUMENTS

| | | | |
|---|---|---|---|
| 2,952,189 | 9/1960 | Pajes | 350/295 |
| 3,171,683 | 3/1965 | Ludwig | 350/61 |
| 3,236,290 | 2/1966 | Lueder | 350/1.7 |
| 3,290,203 | 12/1966 | Antonson et al. | 350/1.7 |
| 3,398,040 | 8/1968 | Allen et al. | 350/1.7 |
| 3,590,681 | 1/1971 | Cross | 350/295 |
| 3,977,930 | 8/1976 | Hunter | 350/1.7 |
| 4,022,947 | 5/1977 | Grubb et al. | 350/1.7 |

FOREIGN PATENT DOCUMENTS

| | | | |
|---|---|---|---|
| 129244 | 12/1976 | Fed. Rep. of Germany | 350/295 |
| 2389143 | 11/1978 | France | 350/295 |
| 1079732 | 8/1967 | United Kingdom | 350/61 |

OTHER PUBLICATIONS

Sato et al,, Takuso, *Applied Optics*, vol. 19, No. 9, May 1, 1980, pp. 1430–1434.

*Primary Examiner*—Jon W. Henry
*Attorney, Agent, or Firm*—Ronald J. Paglierani

[57] ABSTRACT

A self-cleaning optical device, suitable for use in dirty process environments has a composite, multi-layered structure. A protective outer layer, exposed to the process environment, is a transparent plastic film which is resistant to the adhesion of contaminants to its surface. A light-interactive layer, either light-transmissive or light-reflective depending on the intended function of the optical device, is disposed beneath the protective plastic film layer. A semi-rigid plastic material forms a support layer to give the device structural integrity. The optical device is vibrated to shake loose collected particles from the protective plastic film. The vibrational motion is generated either externally or by excitation of piezoelectric materials incorporated into the device construction.

6 Claims, 7 Drawing Figures

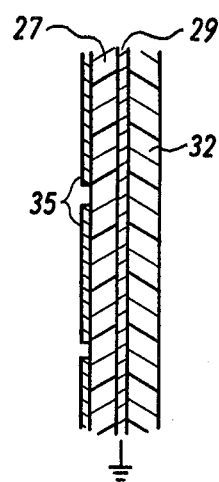
FIG. 5
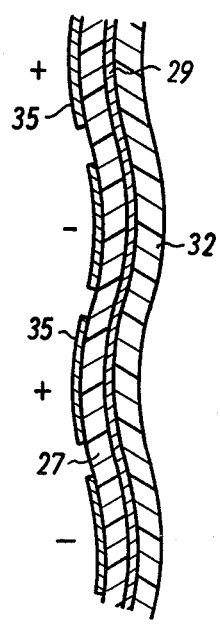 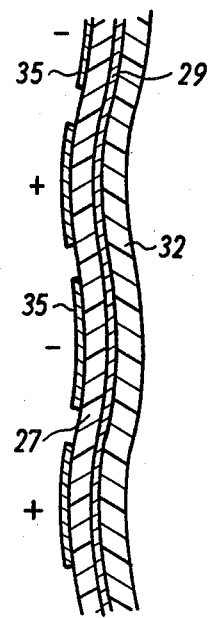
FIG. 6A  FIG. 6B

APPARATUS FOR MAINTAINING CLEAN OPTICAL SURFACES IN PROCESS ENVIRONMENTS

BACKGROUND OF THE INVENTION

The present invention pertains in general to optical devices usable for transmission of light signals in a communication network, and in particular to devices including self-contained means for maintaining a clean exterior surface.

The use of optical sensing devices is becoming increasingly popular for directly monitoring changes in physical parameters, such as those pertaining to environmental quality, and for monitoring the changes in physical mechanisms which in turn are responsive to variations in such parameters. This growing popularity is due in part to the extremely fine resolution attainable with optical devices, since movements of optical devices on the order of a fraction of an inch or of a degree can result in pronounced changes in the amounts of light reflected or transmitted by the device. For example, a light-reflecting mirror can be mechanically coupled to a mechanism which moves angularly in response to a change in temperature. If the mirror is used to reflect light from a fixed light source to a fixed light detector, and the intensity of the light received at the detector is indicative of the magnitude of the temperature, an angular movement of the mirror by a fraction of a degree can make an appreciable change in the amount of light intensity incident on the light detector. Therefore, minute changes in temperature, or some other physical parameter, can be discerned easily.

However, these optical sensing devices often are used in environments which tend to be particularly dirty. Air-borne or fluid-borne particles, to which the sensors may be continually subjected, eventually build up on the light-reflecting or light-transmitting surfaces and severely degrade the performance of the optical sensor. Cleaning the dirty surfaces, to restore the sensor to optimum efficiency, can be a costly, inconvenient process. If a sensor were located, for example, in a pipeline carrying a process fluid, removal of the device for cleaning purposes would necessitate shutdown of the fluid flow, meaning lost production and unnecessary cost.

Therefore, it is an object of the present invention to provide a self-cleaning optical device, which can periodically remove performance-degrading buildups of contaminants from its exterior light-interactive surfaces, so as to maintain optimum operating efficiency.

SUMMARY OF THE INVENTION

A self-cleaning optical device in accordance with a preferred embodiment of the present invention has a multi-layered composite structure. The optical device includes a sheet of semi-rigid backing material, a thin flexible sheet of light-interactive material disposed on one side of the backing material, and a protective layer of transparent plastic film disposed on the outer surface of the light-interactive material. The plastic film is chosen to be particularly resistant to the adhesion of dirt particles to its surface. In one approach, the composite structure is supported so as to permit vibratory movement. An external mechanism for inducing vibration is coupled to the device, so that vibration removes buildup of contaminating particles from the plastic film.

An alternative approach is to use a piezoelectric material as one of the layers. Piezoelectric materials exhibit changes in size and shape upon application of an electric potential. Thus, application of an a.c. or pulsed d.c. voltage to this layer will generate the desired motion.

In a particular embodiment of the present invention, a reflective metallization layer is deposited on the back of the outer layer of transparent plastic film, between the plastic film and the semi-rigid backing material. The optical device is mounted, with the plastic film disposed toward the process environment, by being clamped only at its outer periphery. An ultrasonic transducer is coupled to the the semi-rigid backing material, and low amplitude ultrasonic vibrations shake off any particles remaining on the outer transparent plastic layer. Alternatively, the reflective metallization is applied to the front side of a piezoelectric film, to serve as a first electrode. A metallization pattern on the back side of the piezoelectric film serves as a second set of electrodes. Through the use of appropriate metallization patterns and applied voltage signals, a wide variety of mechanical vibration modes can be generated in the film.

In addition to optical devices which reflect light, the present invention can be incorporated in light-transmissive devices, or optical windows. A metal layer is unnecessary in these optical windows if an external vibrating transducer is used. The functions of the backing layer and the protective layer may be combined in a single monolithic film which is both semi-rigid and impervious to the dirty environment. The alternative piezoelectric approach can also be applied to light-transmissive devices through the use of sufficiently thin metallization layers. Such layers are optically transparent but electrically conductive and hence suitable for use as electrodes.

The motion-generating concepts described herein can also be used to modulate optical signals. Thus these concepts can be applied for the purpose of self-cleaning of the optical devices, processing of optical signals, or both.

BRIEF DESCRIPTION OF THE DRAWINGS

The novel features and advantages of the present invention will become apparent to those skilled in the art from the following description of the preferred embodiment in conjunction with the accompanying drawings in which:

FIG. 5 is a detail sectional view showing the composite structure of a third embodiment of the present invention; and FIGS. 6A and 6B are views, in diagrammatic form, depicting the alternating flexing of the structure of FIG. 5.

DESCRIPTION OF THE PREFERRED EMBODIMENT

Figure 1:
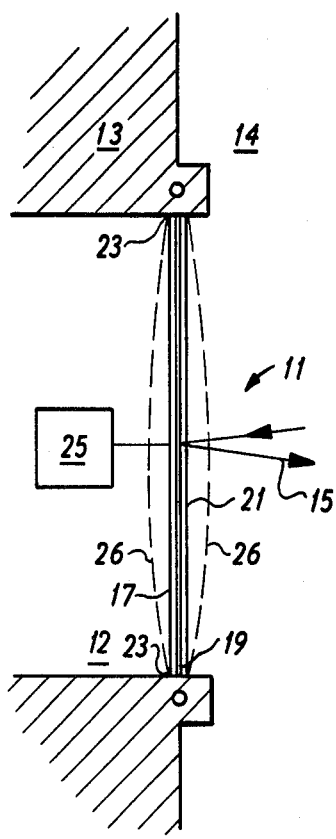
FIG. 1 is a side view, in diagrammatic form showing a self-cleaning optical device in accordance with the present invention.

Referring to FIG. 1, a light-reflective optical device 11 in accordance with the present invention is positioned within an access port 12 in a vessel 13 so as to be exposed to a process 14 within the vessel. The device is arranged to receive light signals 15 from other optical devices (not shown), such as light sources and detectors, to function as a component within a light-processing network. For example, the device could be mounted in a chimney to monitor the amount of suspended particles in the air stream as indicated by the opacity of the air. Alternatively it may be used to reflect, refocus, or otherwise redirect light between or among other light-handling elements within an optical system. The environment, instead of being a gaseous atmosphere, also could be a fluid flow containing suspended solids or contaminating particles.

Figure 2:
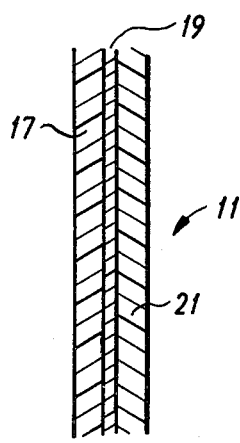
FIG. 2 is a detail sectional view showing the composite structure of the optical device of FIG. 1.

The optical device 11 of the illustrated embodiment has essentially a sandwich-type, composite construction. Referring now to FIG. 2, this composite structure can be better appreciated. A bottom or foundation layer 17 of the device 11 is made of a semi-rigid structural material, such as plastic or the like, which provides structural integrity to the device. A particularly good material for this purpose is Kapton, which is a trademark of E. I, du Pont de Nemours and Company, Inc., for polyimide film. The base layer is sufficiently thin, however, to permit flexing or distortion thereof. A middle layer 19 of the sandwich is a metallic layer having the desired light-reflective properties. This metallic layer can be a separate self-contained metallic layer laid upon the semi-rigid foundation layer, or it can be deposited as a metallization layer of extremely small thickness on the back of an outer protective layer 21. The thickness of such a layer is required to be only several thousandths of an inch, or less, and may vary depending on the amount of reflectivity required for efficient operation.

Completely covering the metallization layer is the outer protective layer 21 which serves as a window to keep potential contaminants within the process environment from directly impinging on the metallic layer. This protective layer is a thin transparent plastic film which has a relatively smooth outer surface, so as to resist the adhesion of contaminants thereto. Particularly good materials for this application are fluorocarbon polymers. These materials are well known to possess "no-stick" properties and resist the tendency of numerous substances to stick to its surface. The three layers form an integrated composite structure, one which can flex or vibrate as a unit.

Referring again to FIG. 1, the optical device 11 is shown as being mounted only at its outer periphery 23 with the outer layer 21 facing toward the process environment 14. By supporting or mounting the device only at its periphery, it is suspended in much the same manner as an audio speaker. However, other appropriate mounting or supporting systems which permit flexing of substantial amounts of the surface area of the device are equally acceptable. A transducer 25 capable of creating low-amplitude ultrasonic vibrations is coupled to the back side of the the semi-rigid foundation layer 17. Although the transducer is shown in this embodiment as making a direct connection to the optical device, in the situations where the optical device contacts a high-temperature environment an intermediate stand-off mechanism (not shown) can be used to isolate the transducer somewhat from the potentially destructive high temperatures.

The ultrasonic transducer 25 is energized either on a continuous basis or in a predetermined periodic manner, as the individual situation requires, to induce vibration of the entire optical device 11. Due to the peripheral suspension of the optical device, it vibrates in the manner of a diaphragm, generally between two positional extremes indicated by imaginary lines 26. The vibrations have the effect of shaking off particles present on the outer layer 21. Vibration in a continuous mode may interfere with the ability of the optical device to perform its intended light-handling function. Therefore the ultrasonic transducer may be operated in a pulsed mode to provide alternating periods of device cleaning and normal device operation. Although in this illustrated embodiment the use of ultrasonic frequencies is described, the usable frequencies are not limited to this region. For example, high amplitude, low-frequency vibrations may have distinct advantages in certain applications.

Figure 3:
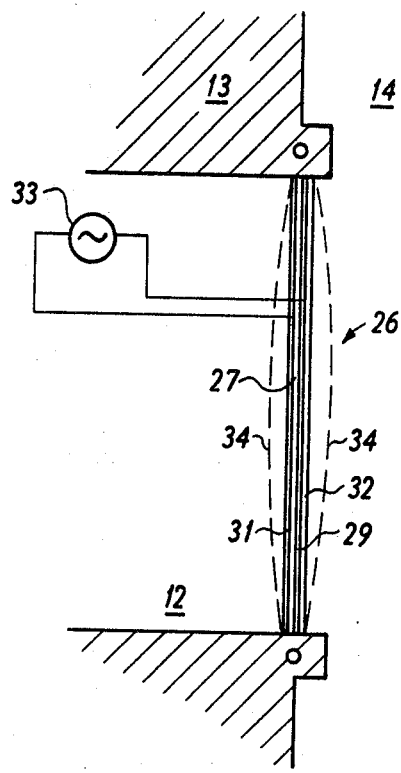
FIG. 3 is a side view, in diagrammatic form, of an alternate embodiment of the present invention.
Figure 4:
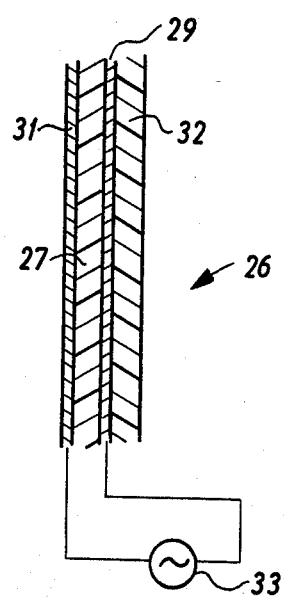
FIG. 4 is a detail sectional view showing the composite structure of the optical device of FIG. 3.

Another embodiment of the present invention utilizes a vibratory scheme different from that shown in FIGS. 1 and 2. As shown in FIG. 3, an optical device 26 is mounted in a similar fashion as the previous embodiment. Referring now to FIG. 4, however, this embodiment uses a foundation layer 27 made of a piezoelectric material, a material which undergoes mechanical deformation in response to an applied voltage. An example of such a material is polyvinylidene fluoride (PVDF) film which has been mechanically oriented and electrically poled. Kureha Chemical Industry Co., Ltd., Tokyo, Japan, is one source of oriented PVDF film. Electrical poling is accomplished by impressing a high voltage (typically 400–500 kV/cm) across the film thickness (typically 12–50 microns) at about 100° C. for 10–60 minutes. The applied electric field is maintained until the film is cooled down to room temperature. These nominal values may change with variations in orientation and thickness as well as with use of piezoelectric materials other than PVDF. If either the mechanical orientation or the electrical poling step is omitted, the piezoelectric properties of the film are reduced.

A middle metallization layer 29 performs the same function as the layer 19 in the previous embodiment. Here the metallization layer 29 is shown as deposited directly on the adjacent surface of the piezoelectric foundation layer 27. In this way, the metallization layer 29 not only performs a reflecting function but also serves as the electrode for application of the electric field to the piezoelectric foundation layer 27. Electrical contact to the back surface of the foundation layer 27 can be made in a variety of manners. In the illustrated embodiment, a second metallization layer 31 is deposited directly on its back surface. As in the earlier embodiment, a transparent plastic film 32 forms the outermost right-hand surface, to protect the metallization layer against the effects of contaminants.

Referring again to FIG. 3, an a.c. voltage, supplied by a conventional source 33 (see also FIG. 4), is applied between the middle metallization layer 29 and the second metallization layer 31. Application of the a.c. voltage alternately drives the piezoelectric foundation layer 27 backwards and forwards, inducing a vibration of the composite optical device 26, between positional extremes indicated by imaginary lines 34. Again, this vibration sheds dirt particles from the outer surface of the plastic film 32. It should be noted that, depending upon the amount of structural stability required of the device as a whole, a layer of compliant, semi-rigid backing material similar to the layer 17 used in the embodiment of FIGS. 1 and 2, may be added to the back side of the outer electrode 31.

Alternative electrode configurations can be used advantageously in certain situations. For example, as shown in FIG. 5, metallization is applied to the back surface of a piezoelectric layer 27 in the form of stripes 35, which serve as multiple electrodes. An a.c. voltage is applied between the metallization layer 29 and the stripes. However, the voltage is not applied to all the stripes simultaneously, but sequentially, a pair at a time, or in some other staggered manner, to cause flexing in the device, similar to that shown in FIGS. 6A and 6B. If the stripes are driven sequentially to induce a traveling wave within the piezoelectric layer, the potential for build-up of contamination at nodal positions is eliminated.

Although much of the previous discussion has been directed to optical surfaces used as reflecting surfaces, similar concepts can be applied for producing transparent optical windows and beam splitters which transmit, rather than reflect, some or all of the incident light. Devices consisting of only a transparent foundation layer and a transparent plastic film layer, without an intervening metallization layer, can be used as windows for light transmitters and receivers. Alternatively, transparent, contaminant-resistant polymeric films, having sufficient inherent structural integrity, can be used to achieve single-layer light-transmissive units. Also, proper selection of the materials making up the various layers will allow the optical devices to be used for processing radiation other than visible light, for example infrared transmissions.

It is also possible to apply thin transparent electrodes to piezoelectric plastics for the purpose of making electrical contact, without blocking the passage of incident light. Thin films of metals are capable of transmitting light while simultaneously conducting electrons. Since metals conduct electricity inherently, only a continuous film is needed for current to pass. Such a continuous film need only be on the order of 100 Angstroms thick. Metal films in this thickness range do transmit light since the absorption of light requires a considerably greater thickness. Electrical conductivity and light transmission can be controlled by appropriately altering the thickness and area of the electrode. Thick films of certain conductive materials such as $SnO_2$ and $SnO_2$-$InO_2$ also provide useful light-transmitting electrodes which are suitable for use in the visible wavelengths.

It will become apparent to those skilled in the art that certain modifications and substitutions may be made in the embodiments described above. For example, alternate structural materials having particularly beneficial temperature withstanding characteristics or vibratory characteristics may become evident. Different methods for inducing vibrations within the optical device structure also may be envisioned. It is intended that such modifications be included within the scope of the following claims.

What is claimed is:

1. A self-cleaning optical device, suitable for use in a dirty environment, comprising:
    a multi-layered composite optical surface including
        a sheet of semi-rigid piezoelectric backing material,
        a thin, flexible, light-interactive first metallized electrode deposited on one side of said piezoelectric backing material,
        a second metallized electrode deposited on the opposite side of said piezoelectric backing material, and
        a protective layer of transparent plastic film disposed on the outer surface of said light-interactive first metallized electrode, said plastic film being resistant to adhesion of particles thereto;
    means for supporting said composite optical surface to permit vibratory movement thereof; and
    a source of electrical energy of varying intensity connected across said first and second metallized electrodes, for inducing vibratory movement of said optical surface, whereby particles deposited on said plastic film are removed.

2. The device as set forth in claim 1, wherein said source of electrical energy comprises an a.c. voltage source.

3. The device as set forth in claim 1, wherein said source of electrical energy comprises a pulsed d.c. voltage source.

4. The device as set forth in claim 1, wherein said first metallized electrode comprises a series of separate metallized stripes.

5. The device as set forth in claim 1 wherein said second metallized electrode is light-reflective.

6. The device as set forth in claim 1, wherein said second metallized electrode is light-transmissive.

* * * * *